United States Patent
Stelzer et al.

(10) Patent No.: US 9,677,231 B2
(45) Date of Patent: Jun. 13, 2017

(54) PROTECTION SYSTEM

(71) Applicant: Trumer Schutzbauten GesmbH, Oberndorf (AT)

(72) Inventors: Gernot Stelzer, Kuchl (AT); Daniel Jäger, Obertrum (AT)

(73) Assignee: Trumer Schutzbauten GesmbH, Oberndorf (AT)

( * ) Notice: Subject to any disclaimer, the term of this patent is extended or adjusted under 35 U.S.C. 154(b) by 97 days.

(21) Appl. No.: 14/368,273

(22) PCT Filed: Dec. 21, 2012

(86) PCT No.: PCT/EP2012/005354
§ 371 (c)(1),
(2) Date: Jun. 23, 2014

(87) PCT Pub. No.: WO2013/091893
PCT Pub. Date: Jun. 27, 2013

(65) Prior Publication Data
US 2014/0374203 A1 Dec. 25, 2014

(51) Int. Cl.
*F16F 7/12* (2006.01)
*E01F 7/04* (2006.01)

(52) U.S. Cl.
CPC ............... *E01F 7/045* (2013.01); *F16F 7/12* (2013.01); *F16F 7/123* (2013.01)

(58) Field of Classification Search
CPC .... E01F 7/045; F16F 7/12; F16F 7/123; F16F 7/128; F16G 11/12; F16G 11/101; F16G 11/103
USPC ........................................ 188/371, 374, 373
See application file for complete search history.

(56) References Cited

U.S. PATENT DOCUMENTS

| | | | | |
|---|---|---|---|---|
| 1,451,493 A | * | 4/1923 | Cruickshank | B64F 1/02 188/371 |
| 3,087,584 A | * | 4/1963 | Jackson | B64D 25/04 105/392.5 |
| 3,750,612 A | * | 8/1973 | D'Agostino, Jr. | B63B 21/04 114/221 R |

(Continued)

FOREIGN PATENT DOCUMENTS

| DE | 102006007029 A1 | 8/2007 |
|---|---|---|
| EP | 1500747 A1 | 1/2005 |

(Continued)

OTHER PUBLICATIONS

Mar. 20, 2013, International Search Report of the International Search Authority from the European Patent Office, in PCT/US2012/005354, which is the international application to this U.S. application.

*Primary Examiner* — Vishal Sahni
(74) *Attorney, Agent, or Firm* — Kolisch Hartwell, P.C.

(57) ABSTRACT

The present invention relates to a device and a method for energy dissipation with a deformable, longitudinally extending material strip which comprises a longitudinal axis and is installed into a cable which can be subjected to tension; and with a deformation device which is also installed into the cable and cooperates with the material strip, characterized in that the material strip, upon application of a tension force to the cable along its longitudinal axis, can be guided in a straight line through the deformation device and in so doing can be deformed.

24 Claims, 6 Drawing Sheets

(56) References Cited

U.S. PATENT DOCUMENTS

| | | | | |
|---|---|---|---|---|
| 4,027,905 | A * | 6/1977 | Shimogawa | F16F 7/123 188/371 |
| 4,304,320 | A * | 12/1981 | Hull | A62B 35/04 188/371 |
| 4,618,026 | A * | 10/1986 | Olson | A62B 35/04 182/4 |
| 4,730,810 | A * | 3/1988 | Rambaud | E01F 7/045 244/110 C |
| 4,753,772 | A * | 6/1988 | Schmertz | F16F 1/46 188/268 |
| 5,421,280 | A * | 6/1995 | Gast | B63B 21/10 114/221 R |
| 5,487,562 | A * | 1/1996 | Hedderly | B60R 22/341 188/371 |
| 5,799,760 | A * | 9/1998 | Small | A62B 35/04 182/3 |
| 5,996,972 | A | 12/1999 | Kaiser | |
| 6,655,716 | B2 * | 12/2003 | Riefe | F16F 7/123 188/374 |
| 6,769,715 | B2 * | 8/2004 | Riefe | B62D 1/195 188/371 |
| 7,104,371 | B2 * | 9/2006 | Renton | A62B 35/04 182/36 |
| 8,302,747 | B2 | 11/2012 | Humfeldt et al. | |
| 2008/0136225 | A1 * | 6/2008 | Murphy | B60N 2/2809 297/216.11 |
| 2011/0067966 | A1 * | 3/2011 | Von Allmen | F16G 11/12 188/371 |
| 2012/0211712 | A1 | 8/2012 | Stelzer et al. | |

FOREIGN PATENT DOCUMENTS

| | | |
|---|---|---|
| EP | 2607553 A1 | 6/2013 |
| JP | 2000-61025 * | 2/2000 |
| JP | 2001248117 A | 9/2001 |
| WO | 02087931 A1 | 11/2002 |
| WO | 2009137951 A1 | 11/2009 |

* cited by examiner

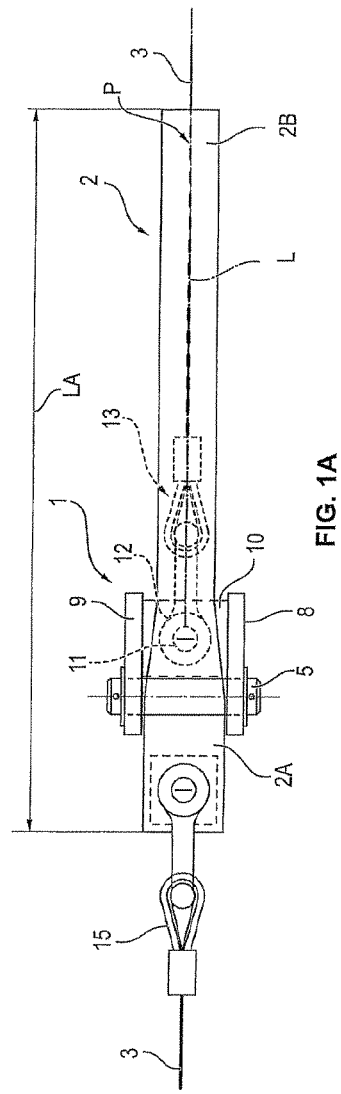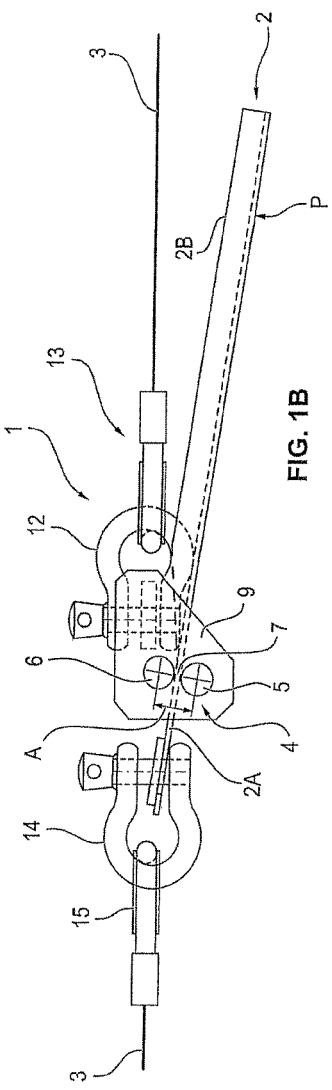
FIG. 1A
FIG. 1B

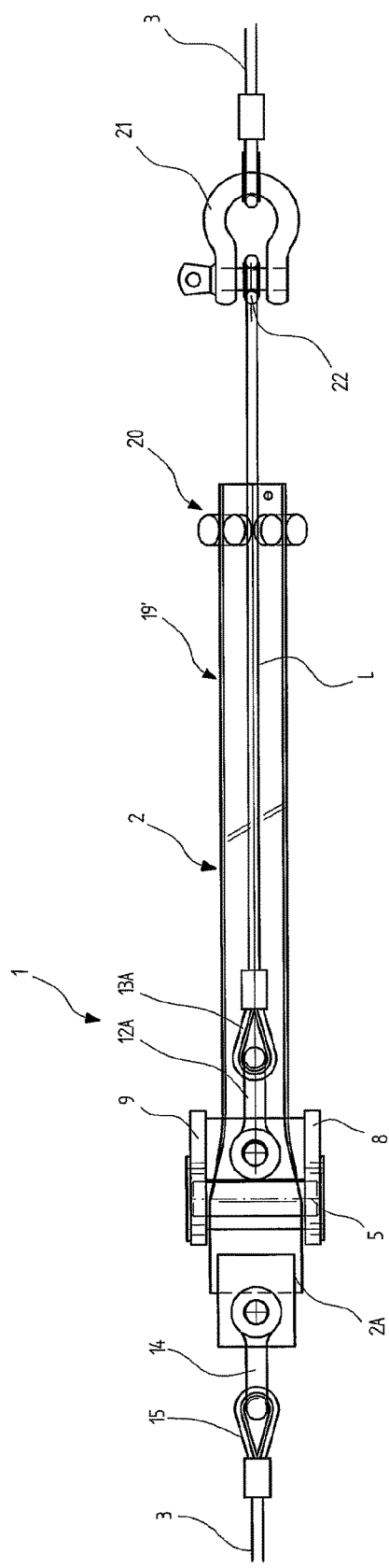
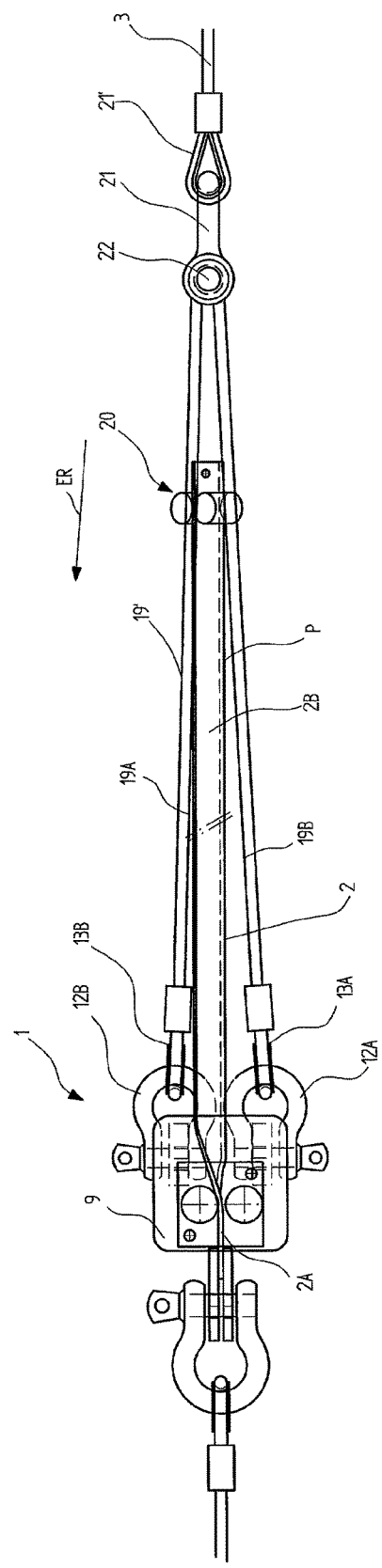
FIG. 5A
FIG. 5B

PROTECTION SYSTEM

CROSS-REFERENCE TO RELATED APPLICATIONS

This application is a national phase application of PCT/EP2012/005354, filed Dec. 21, 2012, which claims priority to European Patent Application No. 11010075.7, filed Dec. 22, 2011 and European Patent Application No. 12006889.5, filed Oct. 4, 2012, all of which are hereby incorporated by reference.

INTRODUCTION

The invention relates to a protection system.

A generic device is known from WO 2009/137951. This known device is formed as a device for shock absorption in cable constructions, particularly for rockfall, mudflow and snow protection systems and absorbs energy introduced into a cable which is subjected to tension, in that an intermediate piece which can be deformed by tension forces and which is installed into a cable which is subjected to tension, comprises one or a plurality of longitudinal elements. In this case, the at least one longitudinal element is, on the one hand, connected with one of its ends to a cable end and, on the other hand, it is guided around a deflecting element connected to another cable end. Finally, means are provided by which the formed deflection angle of the longitudinal element or elements is essentially maintained when the intermediate piece is subjected to loading.

The disadvantage with this known device is firstly found in that it requires a relatively high level of effort in construction especially due to the fact that in order to absorb energy, the intermediate piece is bent or deflected over the deflection element, wherein in order to maintain the deflection angle a particular device must be provided which can consist, e.g. of two guide spigots. Furthermore, tests carried out within the scope of the invention have shown that in spite of the object of the generic document to better define and optimise the shock absorbing progression, in this case there is a further requirement for improvement, particularly when extensive loads are introduced into the cable.

It is thus the object of the present invention to create a protection system according to the present invention, in which an at least substantially linear energy absorption of the loads introduced into the cable is ensured.

This object is achieved by the features of one or more embodiments of the present invention.

In the protection system in accordance with the invention, a deformation device is provided which cooperates with a material strip in such a way that this material strip, when a tension force is applied to the cable to which the material strip is connected, can be guided in a straight line through the deformation device and in so doing is deformed in order to absorb energy. This guidance in a straight line means, in accordance with the invention, that in contrast to the generic prior art, there is no bending or deflection of the material strip since the deformation device in accordance with the invention is constructed in such a way that energy absorption is possible in spite of the fact that such bending or deflection is avoided.

The protection system in accordance with the invention is based on the concept—in spite of avoiding deflection of the material strip which leads to the technical problems mentioned in the introduction—of making energy absorption possible in that a material strip provided with a profile is flattened by the deformation device. Alternatively, it would also be possible to provide a planar, i.e. unprofiled, material strip with a profile by the deformation device, which, by the application of friction and by plastic deformation, produces the required energy absorption for braking or shock absorption in the cable.

In principle, any type of profile, such as e.g. L-, U-, V- or even O-shaped profiles, are feasible as profiles for the material strip.

Accordingly, shaping of a planar material strip into these profiles is also feasible since even in the case of this type of deformation the required energy absorption is ensured.

Another of the advantages of the invention is the fact that the structural form of the device in accordance with the invention can be designed more simply since e.g. no devices are required to maintain a deflection angle since the material strip is actually guided in a straight line, and therefore without deflection, through the deformation device or is pulled therethrough by the cable with application of a tension force.

Furthermore it is advantageously possible, by adjusting a deformation gap between deformation elements to set the desired degree of shaping while the material strip is being pulled through in a straight line, wherein it is also possible e.g. for energy absorption purposes also to reduce the material strip only in its cross-section or only in its height and/or width, for which purpose in the simplest case only two fixed deformation cylinders defining an appropriately set deformation gap or even rotatable deformation cylinders are required.

The protection system in accordance with the invention can be used against rockfalls, falls of wood, landslides or the like (in the manner of e.g. a safety fence along motor racing tracks).

A protection system of this type typically has a support structure which, depending on the system length, comprises a plurality of supports which are spaced apart and can be fixed on a slope. A net, which can preferably be provided with a netting layer, is attached to the supports. For this purpose, an upper and a lower support cable are provided. The upper support cable carries the net in the region of support heads of the supports and the lower support cable carries the net in the region of the support base. Laterally of the net, the upper and lower support cables are attached via rock anchors in the ground, wherein in this region and preferably also in the region of the net, the energy dissipation devices in accordance with the invention can be provided. In principle it is also possible to use only one or a plurality of cables as a support structure, which cable(s) tension(s) the net.

In a particularly preferred embodiment, between the upper support cable and the lower support cable, one or a plurality of central cables is provided which can be connected to the net, e.g. by being looped through it. The connection can be effected continuously over the entire length of the system or can be omitted in the region where the central cables run over the carriers of the support structure, wherein then the looping-through mentioned as an example does not take place in these regions.

The central cables extend over the entire system length and are also fixed in the ground laterally of the outermost carriers of the protection system, wherein in this case once again rock anchors can preferably be provided, in the region of which, energy dissipation devices or cable brakes can be provided, which are designed according to the principles of the present invention.

BRIEF DESCRIPTION OF THE FIGURES

Further details, features and advantages of the invention will become clear from the following description of exemplified embodiments with reference to the drawing in which:

FIGS. 1A and 1B show views of a first embodiment of the device in accordance with the invention, FIGS. 5A and 5B show a view corresponding to FIGS. 2A and 2B of a fifth embodiment of the device in accordance with the invention.

DETAILED DESCRIPTION OF THE FIGURES

Figure 1:
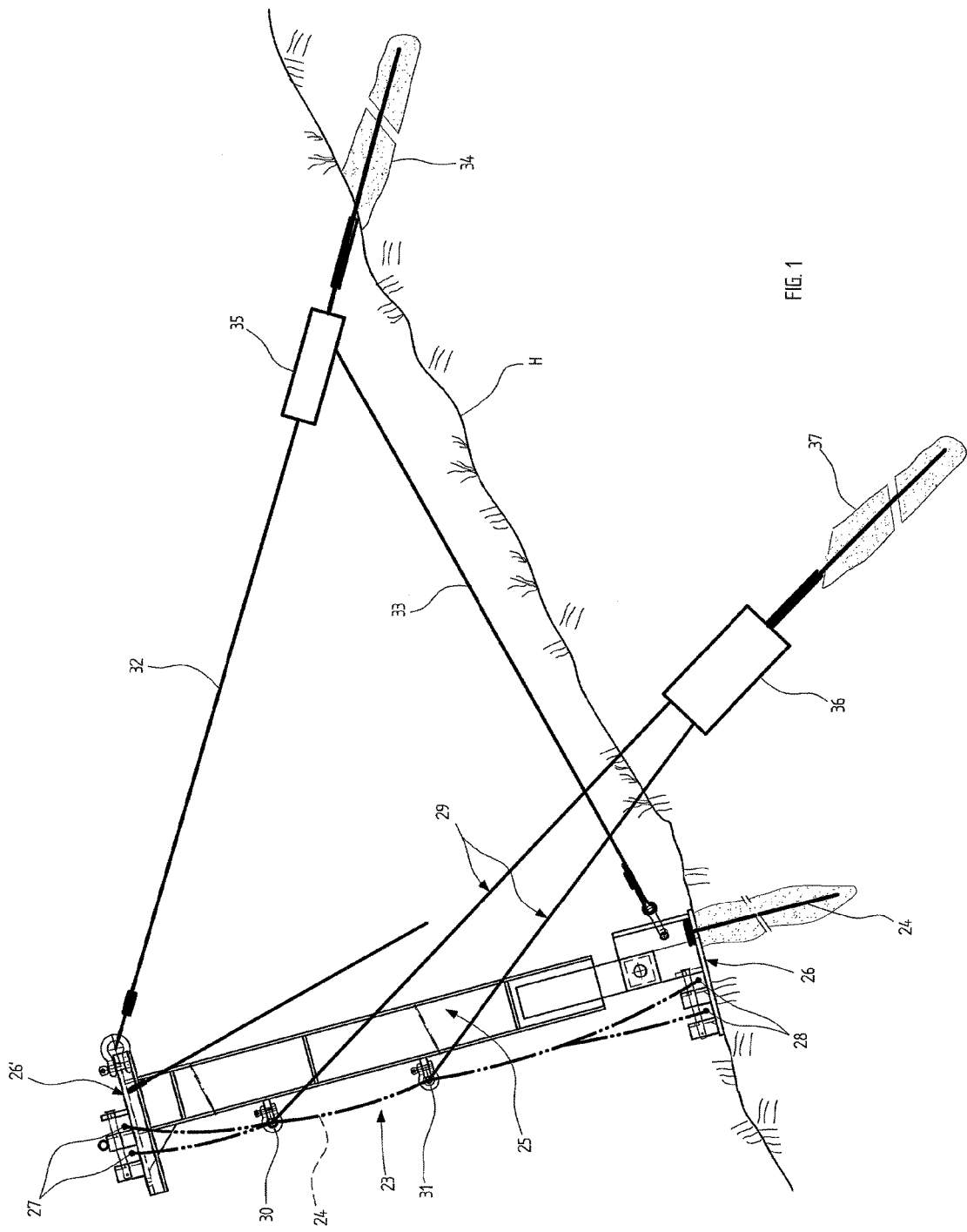
FIG. 1 shows a schematically simplified side view of a protection system in accordance with the invention.

FIG. 1 shows a schematically simplified view of a protection system 23 in accordance with the invention, wherein FIG. 1 shows a side view.

The protection system 23 has a so-called support structure which is generally formed from a plurality of carriers which can be fixed e.g. via rock anchors 24 in the ground of a slope. Depending on the system length of the protection system 23, a plurality of such carriers are provided which can be positioned side by side at selected spacings with respect to one another on the slope H. In principle, it is also possible for only one such carrier or only one cable arrangement to be provided.

The protection system 23 also has a net 24 which, in the region of a support head 26' of the support 25 shown in FIG. 1 is guided via a support cable arrangement 27, wherein it is possible for the support cable arrangement 27 to comprise either one or two upper support cables.

In the region of the support base 26 of the supports 25 a lower support cable arrangement 28 is provided which in turn can be formed from one or two support cables.

Between the upper support cable arrangement 27 and the lower support cable arrangement 28 in the illustrated, particularly preferred example, a central cable arrangement 29 is provided. This cable arrangement 29 can have one or a plurality of central cables which can be guided over guide devices 30 and 31 on the carrier 25. The guide devices 30 and 31 can in this case be designed e.g. as shackles.

Furthermore, the embodiment of the protection system 23 according to FIG. 1 makes it clear that an upper bracing cable 32 and a lower bracing cable 33 are provided. The upper bracing cable 32 holds the support head of the support 25 via an attachment device 34 (rock anchor) in the ground on the slope H, while this fixing is taken over by the lower bracing cable 33 in the lower region (support base 26) of the support 25. As shown in FIG. 1, in each of these bracing cable arrangements 32, 33, a braking element or an energy dissipation device can be connected, which is symbolised in FIG. 1 by the block 35 and can be designed according to the above-described embodiments of the dissipation device in accordance with the invention.

Corresponding fixing of the upper and lower support cables (which is not shown in FIG. 1) and of the central cables, can be effected via an energy dissipation device 36 (also called an energy absorption structure or cable brake) which can also be designed corresponding to the principles of the present invention, which will be explained hereinunder with the aid of FIGS. 1A to 5B. In this case, it is possible to connect a dissipation device 1 into each of the individual cables 27, 28, 29, 32 and 33 or to allocate a plurality of cables (such as e.g. cables 29 and 32, 33) to such a dissipation device 1.

A combined view of FIGS. 1A and 1B will show the structure of the device 1 in accordance with the invention for dissipation or absorption of energy introduced into a cable 3 by tension forces acting on the cable 3.

The device 1 firstly has a deformable material strip 2 which extends longitudinally and has a longitudinal axis L and a selectable length LA. The length LA of the material strip 2 and a material thickness can be adapted to the forces or energy to be absorbed, depending on the particular usage.

The material strip 2 has an introduction portion 2A which is adapted in shape to a deformation gap 7 of a deformation device 4. In this case, the deformation gap 7 is defined by two deformation elements 5 and 6 which can be disposed at a selectable spacing A with respect to each other in the deformation device 4. In the embodiment illustrated in FIGS. 1A and 1B, the deformation gap 7 is straight and the deformation elements 5 and 6 are designed as rotatable rollers or fixed, preferably cylindrical spigots or bolts. If the deformation elements 5, 6 are designed as rotatable rollers, this results in the advantage that there is no slipping on the rollers but rather a rolling action.

For this purpose, the deformation device 4 has two spaced-apart holding plates 8 and 9 which in contour and shape can also be adapted to the particular usage in each case. This naturally also applies to the material thickness and material type, which means that the deformation device 4 can be adapted to the forces to be applied in each case.

The holding plates 8 and 9 receive between them the two deformation elements 5 and 6 which are fixedly connected, e.g. welded, or are rotatably connected at their respective end regions to the holding plates 8 and 9.

Furthermore, FIGS. 1A and 1B show a connection plate 10, which is disposed in each case between the holding plates 8 and 9 and is attached, e.g. welded, thereto. The connection plate 10 has an aperture 11 to which, according to the illustration of FIG. 1A, a connection element 12, e.g. in the form of a shackle, can be attached, which is in turn attached to an anchoring element 13 shown only schematically in FIG. 1A, which is typically connected to the cable. This anchoring element 13 can, however, also be designed as a tension anchor which is anchored e.g. in a mountainside, if the cable 3 is part of a rockfall protection system which, with the aid of a net, which is guided by one or a plurality of cables such as cable 3, catches boulders falling down from a mountain. The device 1 can, however, also be suspended between cables or cable portions 3A, 3B (see FIG. 3B).

The material strip 2 also has a profiled portion 2B which is L-shaped in the example illustrated in FIGS. 1A and 1B. However, as explained in the introduction, any other type of deformable profiles are feasible for the material strip 2 in the embodiment according to FIGS. 1A and 1B.

As shown by the illustration in FIG. 1A, the introduction portion 2A is fixed on a connecting piece (shackle) 14, to which either a stationary tension anchor or the cable 3 can be connected, e.g. by means of a cable loop 15 or other suitable connecting elements, if the deformation device 1 is installed into a cable or between the cable portions thereof.

The device 1 according to the embodiment of FIGS. 1A and 1B operates as follows:

If, e.g. by catching a boulder by means of a slope protection system, a tension force is introduced into the cable 3, which can be part of such a slope protection system, the cable 3 pulls the material strip 2 through the deformation gap 7 of the deformation device 4, wherein previously the introduction portion 2A adapted to the shape of the deformation gap 7 has been introduced into the deformation gap 7 and has been connected to the cable 3. Since in the embodiment of FIGS. 1A and 1B the deformation gap 7 is a straight line, the introduction portion 2A is flattened accordingly so that introduction of the portion 2A into the deformation gap 7 becomes possible. As the material strip 2 is being pulled through the deformation gap 7, the profiled portion 2B of the deformation strip moves into the deformation gap, which flattens the profiled portion 2B by the effect of the deformation elements 5 and 6 and therefore by generating friction and plastic deformation dissipates the energy introduced into the cable 3. The material strip 2 is pulled through the deformation gap 7 entirely without any deflection, which leads to the advantages explained above.

Figure 2A:
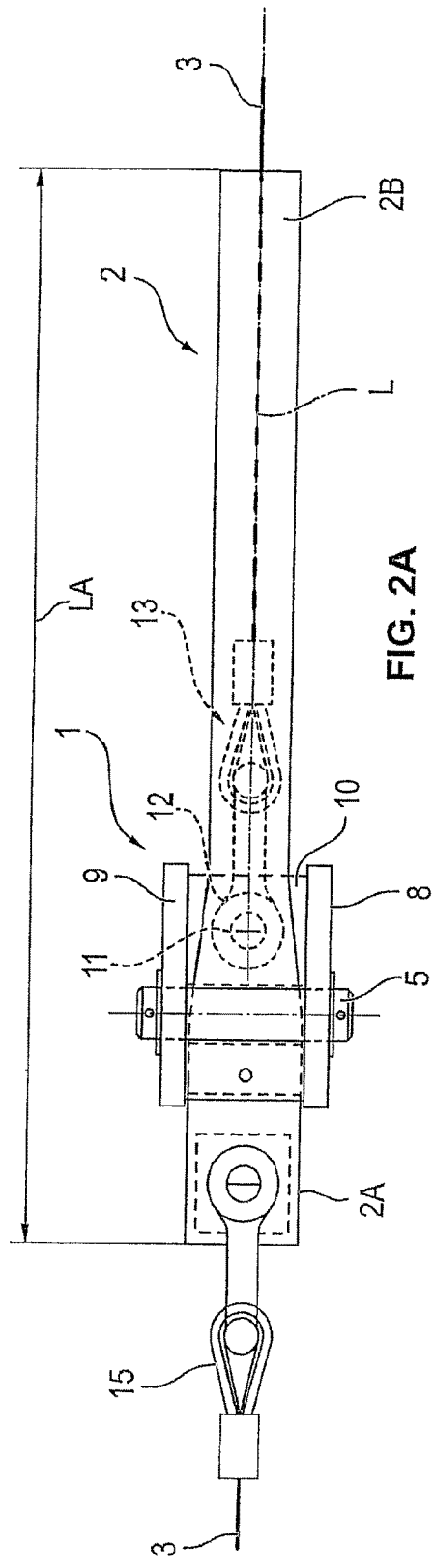
FIGS. 2A and 2B show views of a second embodiment.
Figure 2B:
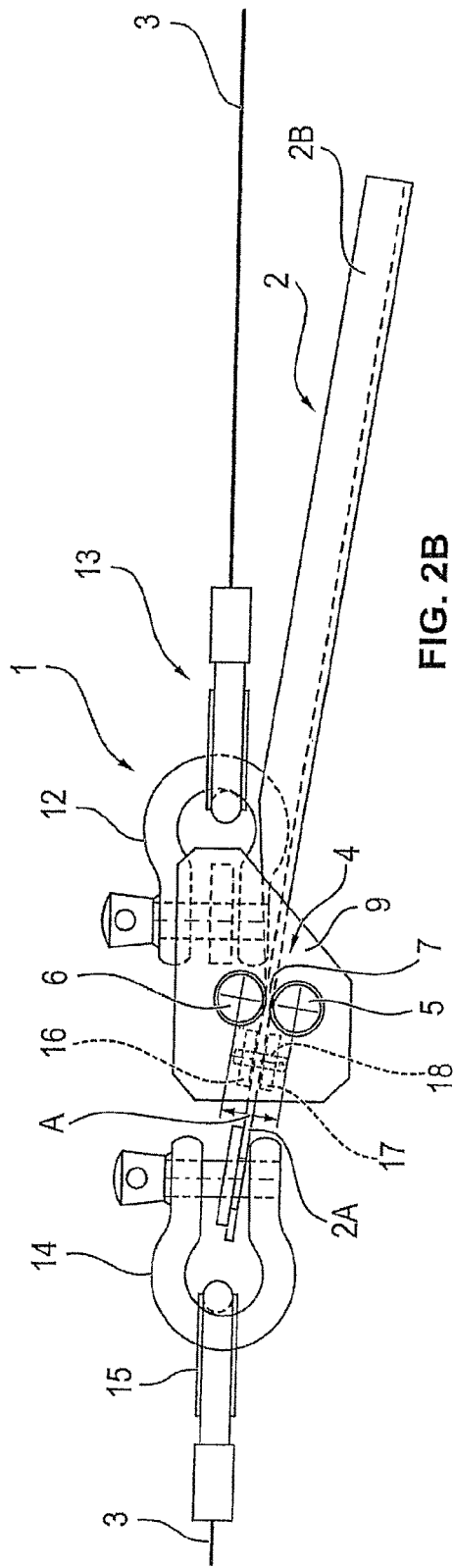

According to FIGS. 2A and 2B, a second embodiment of the device 1 in accordance with the invention is illustrated, which corresponds essentially to the first embodiment, which means that all parts corresponding to this embodiment are provided with the same reference numerals. Thus, in this respect, reference can be made to the description given above.

The second embodiment has, as supplementary features, two tabs 16 and 17 which are disposed between the holding plates 8 and 9 and connected thereto and have a securing bolt 18 extending therethrough, which also passes through an aperture in the material strip 2. In this way, it is possible to prevent the material strip 2 being pulled through to a defined triggering value which is the force at which the securing bolt 18 shears through.

Figure 3A:
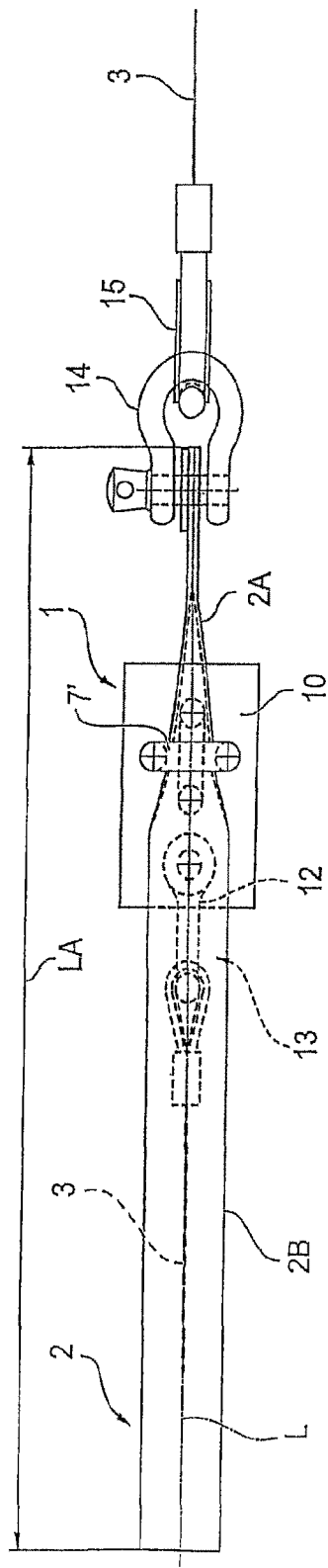
FIGS. 3A and 3B show views of a third embodiment of the device in accordance with the invention.
Figure 3B:
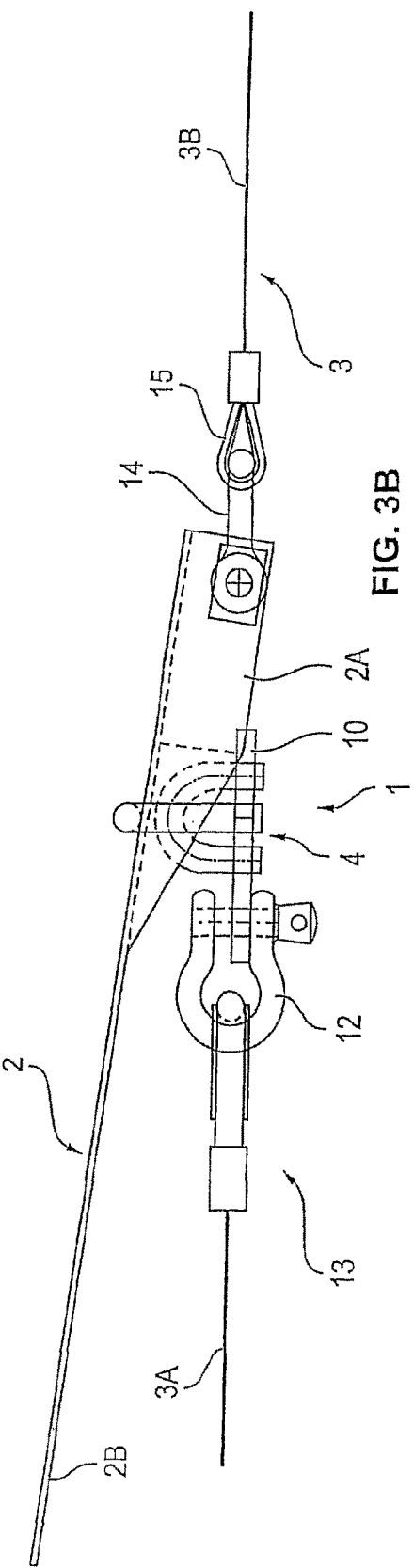

In the embodiment according to FIGS. 3A and 3B, all parts which correspond in structure to those in FIGS. 1A and 1B are provided with the same reference numerals.

As shown by FIGS. 3A and 3B, in this embodiment a dissipation of the energy introduced into the cable 3 is rendered possible in that a planar or uncontoured material strip 2 is stamped with a contour or profile by the contoured deformation gap 7', which in turn generates friction and a plastic deformation which serves for energy absorption purposes. The shape of the deformation gap 7' illustrated in FIGS. 3A and 3B is given purely by way of example and can accordingly be modified to generate other profiles (in this case a U-shaped profile).

In a manner corresponding to the illustration of FIGS. 2A and 2B or 3A and 3B, FIGS. 4A and 4B illustrate a fourth embodiment of the energy dissipation device 1 in accordance with the invention (also called an energy absorption element or cable brake).

All elements which correspond to the above-described embodiments in design and function are provided with the same reference numerals, so that reference can be made in relation to the description thereof to the above passages of text relating to FIGS. 2A, 2B, 3A and 3B.

Figure 4A:
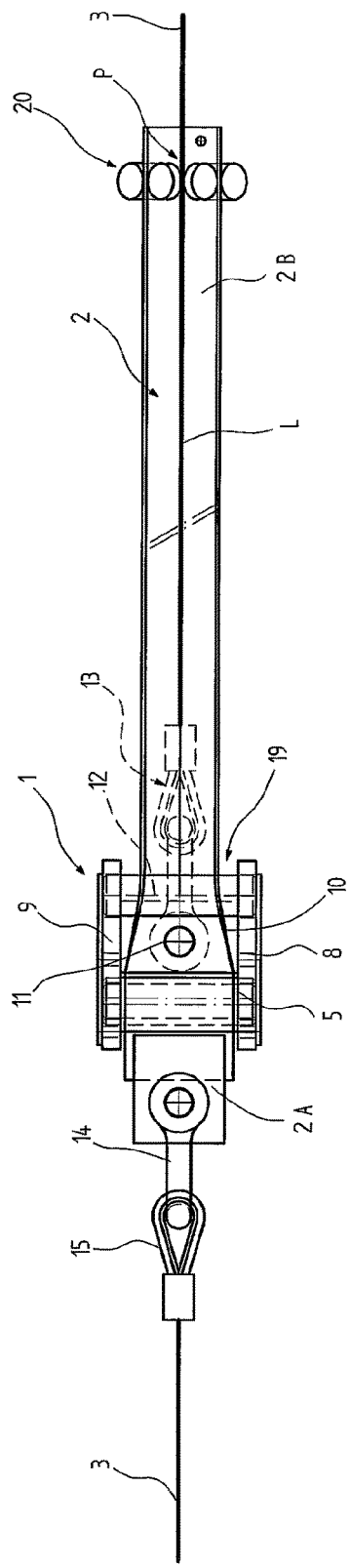
FIGS. 4A and 4B show views corresponding to FIGS. 2A and 2B of a fourth embodiment of the device in accordance with the invention.
Figure 4B:
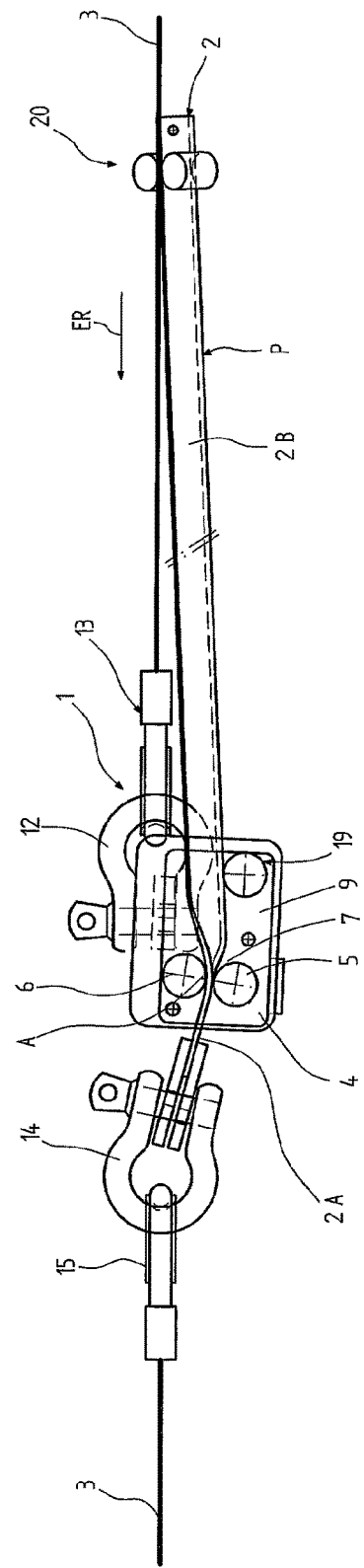

The embodiment according to FIGS. 4A and 4B has, as a further feature, an anti-kink device 19. In the illustrated exemplified embodiment, this anti-kink device 19 is formed as a fixed bolt or preferably as a rotatable roller which is disposed between the holding plates 8 and 9 and is either attached thereto or, in the case of rotatable rollers, is disposed in a rotatable manner between these two holding plates 8 and 9. For this purpose, it is feasible e.g. to attach a fixed axle by its end regions to the holding plates 8 and 9 and to place a rotatable roller on this fixed axle.

According to the illustration in FIG. 4B, the anti-kink device 19 is disposed spaced apart from the deformation device 4. In order to explain this spacing, FIG. 4B illustrates the direction in which the material strip 2 is drawn into the deformation device 4 by the arrow ER. Accordingly, as seen in this direction ER, the anti-kink device 19 is disposed upstream of the deformation device 4. This means that the undeformed profile portion 2B is supported on the anti-kink device 19 so that when the material strip 2 is being pulled through the deformation device 4, kinking of the still undeformed profile portion 2B, according to illustration selected in FIG. 4B, downwards in FIG. 4B can be avoided. Avoidance of such kinking is advantageous in order that, when the material strip 2 is being pulled through the deformation device 4, the undeformed profile portion 2B does not fold away so far that it would become impossible or considerably more difficult to pull the material strip through the deformation device 4 by reason of the forces then arising.

As the embodiment according to FIGS. 4A and 4B further makes clear, an end stop 20 is provided at the end of the profile portion 2B. This end stop 20 can be produced by welding one or a plurality of protrusions on the inner sides or outer sides of the profile portion 2B and the material strip 2 is prevented from being pulled out of the device 1 since the stop 20 prevents the material strip 2 from being completely pulled out in this way by abutting against the deformation device 4.

FIGS. 5A and 5B illustrate a fifth embodiment of the device in accordance with the invention, which, like the embodiment according to FIGS. 4A and 4B, comprises an anti-kink device which, by reason of the different design in FIGS. 5A and 5B, is designated by reference numeral 19'.

All other parts which correspond to the previous embodiments are once again provided with the same reference numerals.

As a combined view of FIGS. 5A and 5B will show, the anti-kink device 19' has two shackles 12A and 12B which, according to FIG. 5B, each engage on side regions of the device 1 and are respectively connected via connecting elements 13A, 13B (in this case cable loops) to portions 19A and 19B of a cable loop. This cable loop 19A, 19B is connected via a connecting ring 22, in which the portions 19A and 19B come together, to a shackle 21 which in turn is connected via a cable loop 21' or the like to the cable 3 as shown by a combined view of FIGS. 5A and 5B. By means of this arrangement, kinking or folding away of the profile portion 2B of the material strip 2 is prevented since this strip—as shown particularly by the illustration of FIG. 5B—is centred and accordingly a folding-away or kinking action is prevented.

As a further alternative to the previously described anti-kink devices 19 and 19' which, however, is not illustrated in the figures, it would be feasible to connect the end of the profile portion 2B to the cable 3 in a suitable manner, e.g. by suspending it via a shackle in the cable.

It should also be stated that all the previously described embodiments of the energy dissipation device 1 in accordance with the invention are provided with material strips 2, 2', the respective profile portions 2B of which are to be formed with a smooth surface, apart from the provision of the stop 20, without the provision of any protrusions.

The present invention relates to a device (1) and a method for energy dissipation with a deformable, longitudinally extending material strip (2) which comprises a longitudinal axis (L) and is installed into a cable (3) which can be subjected to tension; and with a deformation device (4) which is also installed into the cable (3) and cooperates with the material strip (2), characterised in that the material strip (2, 2'), upon application of a tension force to the cable (3) along its longitudinal axis (L), can be guided in a straight line through the deformation device (4) and in so doing can be deformed.

The present disclosure may include one or more of the following concepts:

A. Protection system having an energy dissipation device (1), which comprises:
   a deformable, longitudinally extending material strip (2) which comprises a longitudinal axis (L) and is installed into a cable (3) which is subjected to tension; and
   a deformation device (4) which cooperates with the material strip (2),
   wherein the material strip (2), upon application of a tension force to the cable (3) along its longitudinal axis (L), can be guided in a straight line through the deformation device (4) and in so doing can be deformed,
   wherein the deformation device (4) has two deformation elements (5, 6) in the form of rotatable rollers which can be positioned at a selectable spacing (A) with respect to one another and in so doing define a deformation gap (7) formed as a straight line, and
   wherein the material strip (2) is a profiled rod.

B. Protection system in accordance with paragraph A, characterized by an anti-kink device (19; 19') which, as seen in the pulling-in direction (ER) of the material strip (2) into the deformation device (4), is disposed upstream of deformation device (4).

C. Protection system in accordance with paragraph A or B, characterized in that the deformation device (4) has two spaced-apart holding plates (8, 9) to which the ends of the deformation elements (5 and 6) are attached.

D. Protection system in accordance with paragraph C, characterized in that a connection plate (10) is disposed between the holding plates (8, 9) and is attached to the holding plates (8, 9).

E. Protection system in accordance with paragraph D, characterized in that the connection plate (10) is provided with an aperture (11).

F. Protection system in accordance with any of the previous paragraphs, characterized in that the anti-kink device (19) is formed as a guide roller.

G. Protection system in accordance with any of paragraphs A to E, characterized in that the anti-kink device (19') is formed as a cable loop arrangement (12A, 12B, 13A, 13B, 19A, 19B, 22, 21, 21').

H. Protection system in accordance with any of paragraphs A to G, characterized by a support structure (25).

I. Protection system in accordance with paragraph H, characterized by a net (24) which is guided via an upper support cable arrangement (27) and a lower support cable arrangement (28) on the support structure (25).

J. Protection system in accordance with any of paragraphs A to I, characterized in that the material strip (2; 2') is made of aluminium or steel.

K. Protection system in accordance with any of paragraphs A to J, characterized in that the deformation elements (5, 6) are provided with a friction-reducing coating.

L. Protection system in accordance with any of paragraphs A to K, characterized in that the material strip (2) is formed with a smooth surface.

M. Protection system in accordance with any of paragraphs A to L, characterized in that the deformation device (4) has a securing bolt (18) held by two tabs (16, 17) and passing through an aperture in the material strip (2).

N. Protection system in accordance with any of paragraphs A to M, characterized in that the deformation device (4) is connected to a stationary anchoring element (13) and is connected via the material strip (2, 2') to the cable (3).

O. Protection system in accordance with any of paragraphs A to M, characterized in that the deformation device (4) is installed into a cable (3), wherein it is connected at one end via a connecting device (12, 13) to a first cable portion (3A) and at the other end via the material strip (2) to a second cable portion (3B) of the cable (3).

In addition to the above written disclosure of the invention, reference is explicitly made herein to the illustration thereof in FIGS. 1 to 5B of the drawing.

One or more embodiments of the present disclosure may include one or more of the following features, which correspond to reference numerals in the drawings:

REFERENCE LIST 1 energy dissipation device
2, 2' material strip
2A introduction portion
2B profile portion
3 cable
4 deformation device
5, 6 deformation elements
7, 7' deformation gap
8, 9 holding plates
10 connection plate
11 aperture
12, 12A, 12B connection element/shackle
13, 13A, 13B anchoring/connecting element/tension anchor/shackle/cable loop
14 connection element/shackle
15 connecting element/cable loop
16, 17 tabs
18 securing bolt
19, 19' anti-kink device
19A, 19B portions of a cable loop
20 stop
21 shackle
21' cable loop for connection to the shackle 21
23 protection system
24 net
25 carrier
26 support base
26' support head
27 upper support cable arrangement
28 lower support cable arrangement
29 central cable arrangement
30, 31 cable guiding elements (shackles)
32, 33 upper and lower bracing cable arrangement
34, 37 attachment elements (rock anchors)
35, 36 energy dissipation device (cable brake, energy absorption element)
L longitudinal axis
LA length
A spacing
P profile
H slope
ER pulling-in direction

What is claimed is:
1. A rockfall, mudflow, and snow protection system having an energy dissipation device, comprising:

a deformable, longitudinally extending material strip that is a profiled rod, has a longitudinal axis, and is configured to cooperate with a cable adapted for being tensioned; and a deformation device which cooperates with the material strip, wherein the material strip upon application of a tension force to the cable, via at least one of a rockfall, a mudflow, and a snow, along the longitudinal axis, can be guided in a straight line through the deformation device and in so doing can be deformed, further wherein the deformation device has two deformation elements in the form of rotatable rollers which can be positioned at a selectable spacing with respect to one another and in so doing define a deformation gap formed as a straight line, and further wherein the protection system includes a net coupled to at least one support of the protection system and is configured to cooperate with the cable.

2. The protection system of claim 1, further comprising an anti-kink device which, as seen in a pulling-in direction of the material strip into the deformation device, is disposed upstream of the deformation device.

3. The protection system of claim 2, wherein the anti-kink device is formed as a guide roller.

4. The protection system of claim 2, wherein the anti-kink device is formed as a cable loop arrangement.

5. The protection system of claim 1, wherein the deformation device has two spaced-apart holding plates to which a respective end of one or more deformation elements is/are attached.

6. The protection system of claim 5, further comprising a connection plate disposed between the holding plates and attached to the holding plates.

7. The protection system of claim 6, wherein the connection plate is provided with an aperture.

8. The protection system of claim 1, further comprising a support structure proximate the cable.

9. The protection system of claim 8, further wherein the net is guided via an upper support cable arrangement and a lower support cable arrangement on the support structure.

10. The protection system of claim 1, wherein the material strip is made of aluminium.

11. The protection system of claim 1, wherein the material strip is made of steel.

12. The protection system of claim 1, wherein the material strip is formed with a smooth surface.

13. The protection system of claim 1, wherein the deformation elements are provided with a friction-reducing coating.

14. The protection system of claim 1, wherein the deformation device has a securing bolt held by two tabs and passing through an aperture in the material strip.

15. The protection system of claim 1, wherein the deformation device is connected to a stationary anchoring element and is connected via the material strip to the cable.

16. The protection system of claim 1, wherein the deformation device is configured to cooperate with the cable, wherein it is connected at one end via a connecting device to a first cable portion of the cable and at the other end via the material strip to a second cable portion of the cable.

17. The protection system of claim 1, wherein the deformation device has two spaced-apart holding plates to which a respective end of the two deformation elements are attached and has a securing bolt held by two tabs and passing through an aperture in the material strip.

18. The protection system of claim 17, further comprising an anti-kink device which, as seen in a pulling-in direction of the material strip into the deformation device, is disposed upstream of the deformation device.

19. The protection system of claim 18, wherein the deformation device is connected to a stationary anchoring element and is connected via the material strip to the cable.

20. The protection system of claim 19, wherein the anti-kink device is formed as one of a guide roller or a cable loop arrangement.

21. The protection system of claim 1, wherein the deformation device has two spaced-apart holding plates, two tabs each coupled to the spaced-apart plates and extending between the two spaced-apart plates, and a securing bolt extending between the two tabs and passing through an aperture in the material strip, and wherein the securing bolt is configured to prevent relative motion of the material strip and the deformation device below a tension threshold and to shear above the tension threshold thereby allowing relative motion of the material strip and the deformation device.

22. The protection system of claim 1, wherein the longitudinally extending material strip includes a first portion extending along the longitudinal axis of the longitudinally extending material strip and a second portion extending along the longitudinal axis of the longitudinally extending material strip, with the first portion connected to the second portion along respective long edges of the first and second portions.

23. The protection system of claim 1, wherein the longitudinally extending material strip has an L-shaped cross section.

24. A rockfall, mudflow, and snow protection system having an energy dissipation device, comprising:

a flat material strip that is deformable, longitudinally extending, has a longitudinal axis, and is configured to cooperate with a cable adapted for being tensioned;

a deformation device which cooperates with the flat material strip, wherein the flat material strip upon application of a tension force to the cable, along the longitudinal axis, can be guided in a straight line through the deformation device and in so doing deforms the flat material strip into a profiled strip; and a net coupled to at least one support and configured to cooperate with the cable, further wherein the deformation device has two deformation elements in the form of rotatable rollers which can be positioned at a selectable spacing with respect to one another and in so doing define a deformation gap formed as a straight line.

* * * * *